Patented Feb. 16, 1954

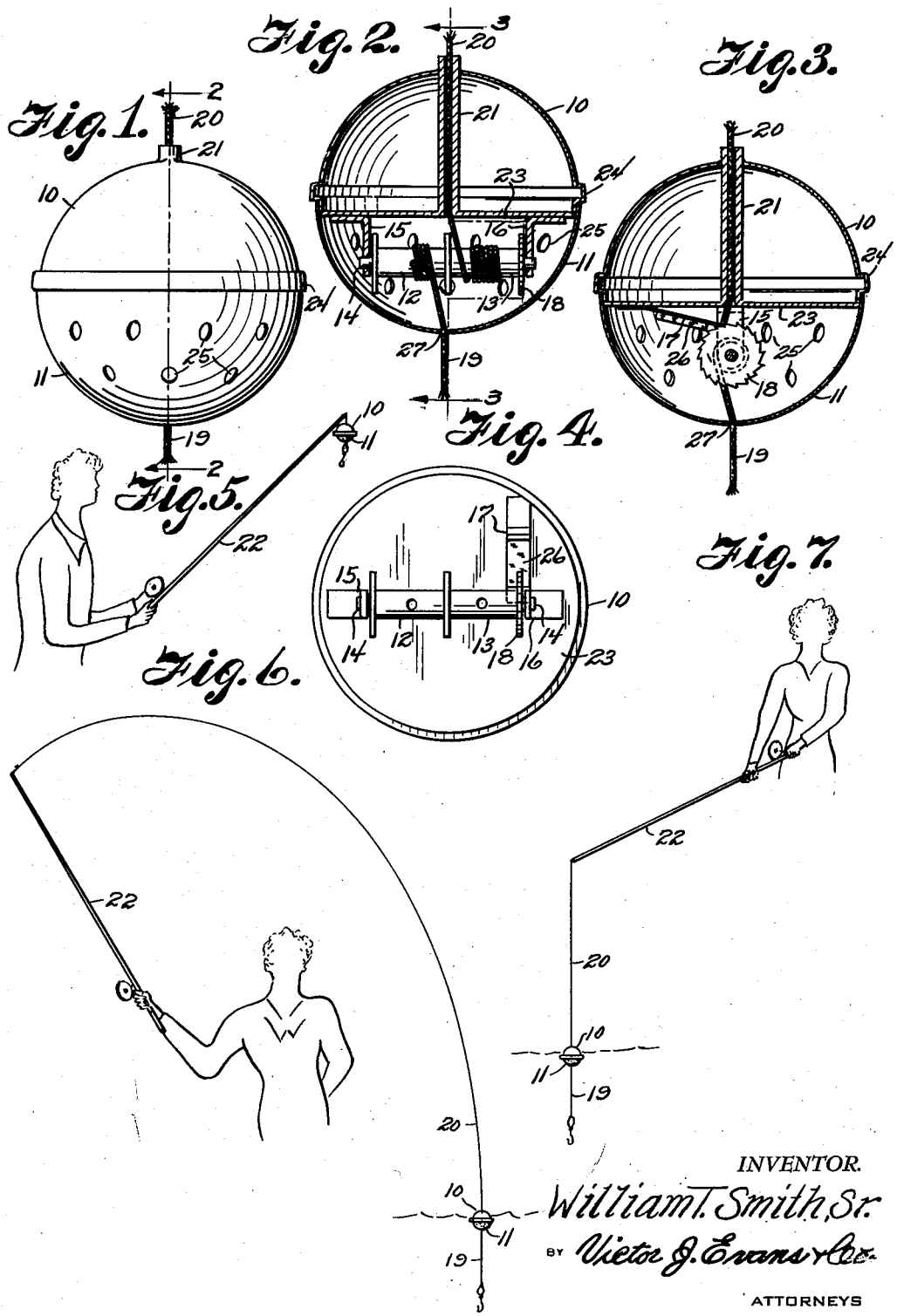

2,669,054

UNITED STATES PATENT OFFICE 2,669,054

FISHING LINE FLOAT

William T. Smith, Sr., Hialeah, Fla.

Application June 26, 1952, Serial No. 295,616

1 Claim. (Cl. 43—43.11)

This invention relates to floats used in fishing, and in particular a float having a combination reel therein wherein with the float cast to a desired position on the water a section of line having hooks and a sinker thereon is released whereby the hooks and sinker drops downwardly through the water.

The purpose of this invention is to provide a float for a fishing line wherein means is provided in the float for paying out a section of line having hooks and a sinker thereon with the float positioned in the water and in which means is provided for retrieving the section of the line with the hooks and sinker thereon as the float is withdrawn from the water.

Various types of devices have been provided in combination with fishing lines for holding an extended section of a fishing line until the line is cast to a position for fishing and wherein after arriving at such position the line is released. However, it is difficult to retrieve a line released from a device of this type. With this thought in mind this invention contemplates a float having a paying out and also a retrieving element therein and wherein the paying out means is actuated by a float in the device and the retrieving means, by a pull on the fishing line.

The object of this invention is, therefore, to provide an improved fishing line float wherein a double spool or reel positioned in the lower part of the float is adapted to pay out the section of line having hooks, bait and a sinker thereon when the float arrives at a position in the water and which is also provided with means for retrieving the said section of line with the hooks, bait, and sinker thereon when the line is drawn inwardly.

A further object of the invention is to provide a fishing line float having means incorporated therein for paying out and retrieving a section of line in which the float is connected to and actuated by a single fishing line.

A still further object of the invention is to provide an improved fishing line float having means for paying out a fishing line and also means for retrieving the fishing line incorporated therein in which the device is of a simple and economical construction.

With these and other objects and advantages in view the invention embodies a substantially hollow body having a sealed upper section and an open lower section with a combination spool journaled on a common shaft in the lower section and with a pawl having a float thereon mounted in the lower section and the pawl being positioned to engage teeth on an end of the spool.

Other features and advantages of the invention will appear from the following description taken in connection with the drawing, wherein:

Figure 1 is a side elevational view illustrating the improved float.

Figure 2 is a vertical section through the float on the line 2—2 of Fig. 1 with certain parts in full and showing the double reel with a portion of the hook and sinker section of the fishing line positioned on a section at one end and with the line from the fishing pole on the section at the opposite end and showing the line from the fishing pole extended to a sleeve in the upper part of the float.

Figure 3 is also a vertical section through the float on the line 3—3 of Fig. 1 with certain parts in full and looking from a point at a right angle to that shown in Fig. 2.

Figure 4 is a bottom plan view of the upper section of the float as shown in Fig. 1 with the lower section removed.

Figure 5 is a schematic view illustrating the position of the float on a fishing line with the device in position for casting.

Figure 6 is a view similar to Fig. 5 showing the float cast to a desirable position in the water.

Figure 7 is also a similar view showing the device in position for fishing.

Referring now to the drawing wherein like reference characters denote corresponding parts the improved fishing line float of this invention includes a semi-spherical sealed upper section 10, a lower semi-spherical section 11 frictionally secured to the section 10, a reel having sections 12 and 13 journaled by a shaft 14 in brackets 15 and 16 in the section 11, a pawl 17 positioned to engage a ratchet wheel 18 on one end of the reel and a fishing line having a hook and sinker section 19 adapted to be positioned on the section 12 of the reel and a section 20 positioned on the section 13 of the reel and extended through a tube 21 in the upper section 10 of the float to a fishing rod as indicated by the numeral 22.

The upper section 10 is provided with a base 23 from which the tube 21 extends and the upper end of the sleeve extends to the wall of the section providing a continuous guide for the fishing line 20 through the upper section of the float. The upper section is also provided with an annular collar or ridge 24 that provides a stop for the upper edge of the lower section.

The brackets 15 and 16 are mounted on the base 23, preferably by welding and with the lower section 11 of the float provided with openings 25 water enters the lower section as the float arrives in position upon the surface of the water and as the water level moves upwardly in the lower section 11 a float 26 on the pawl 17 moves the pawl upwardly whereby the end thereof is disengaged from the ratchet teeth of the wheel 18. Whereby the reel is free to rotate and the weight of the hooks, sinker and bait draws the section 19 of the fishing line downwardly through the water with the line unwinding on one side of the reel and with the line 20 winding on the opposite side thereof.

By this means the same amount of line that unwinds from the section 12 is wrapped around the section 13, whereby in retrieving the line, an upward pull on the fishing line 20 rotates the double reel, winding the line section 19 on the reel 12 until the hooks and sinker arrive at the original position, as illustrated in Fig. 5. The lower section 11 of the float is provided with an opening 27 through which the line section 19 of the fishing line extends.

With the parts thus retrieved the reel is held by the pawl 17 the float is cast to a position in the water at which time the ratchet wheel 18 is released whereby the section 19 of the fishing line is drawn by the weight of the sinker and hooks downwardly through the water, at the same time winding the upper part 20 of the fishing line on the section 13 of the reel.

The length of the section 19 of the fishing line is determined by the fisherman and the hooks and sinker positioned thereon accordingly.

It will be understood that modifications, within the scope of the appended claim, may be made in the design and arrangement of the parts without departing from the spirit of the invention.

What is claimed is:

A fishing line float comprising a hollow semispherical upper section of a casing, said upper section being sealed, a perforated lower section frictionally mounted on the upper section and provided with openings whereby water enters said lower section, a reel having a pair of spools thereon journaled on the lower end of the upper section and positioned in the lower section, a ratchet wheel positioned on said reel, a pawl mounted on the upper section and positioned to engage the teeth of the ratchet wheel to prevent the reel turning in one direction, a fishing line section having hooks and a sinker thereon extended around a section of the reel, a second fishing line section extended around another section of the reel, and extended through the upper section of the float, and a float positioned on the pawl for elevating the pawl to release the ratchet wheel and reel as the lower section of the float fills with water, whereby the section of the fishing line having hooks and a sinker thereon is released.

WILLIAM T. SMITH, Sr.

References Cited in the file of this patent

UNITED STATES PATENTS

| Number | Name | Date |
|---|---|---|
| 541,789 | Kunzelman | June 25, 1895 |
| 1,973,028 | Thomas | Sept. 11, 1934 |
| 2,190,113 | Creitzberg | Feb. 13, 1940 |
| 2,226,331 | Allison | Dec. 24, 1940 |
| 2,479,642 | Schiffmann | Aug. 23, 1949 |